United States Patent [19]

Izumi et al.

[11] 4,393,897
[45] Jul. 19, 1983

[54] FLUID OUTLET STRUCTURE

[75] Inventors: Masao Izumi, Fujisawa; Hiroshi Yoshida, Zama; Yukio Yoshikawa, Hiratsuka, all of Japan

[73] Assignees: Nissan Motor Co., Ltd., Yokohama; Tokyo Sokuhan Co., Ltd., Zama, both of Japan

[21] Appl. No.: 208,386

[22] Filed: Nov. 19, 1980

[30] Foreign Application Priority Data

Nov. 20, 1979 [JP]  Japan ................................ 54-149452

[51] Int. Cl.³ .............................................. F15C 1/04
[52] U.S. Cl. .................................. 137/831; 137/832; 137/833
[58] Field of Search ............... 137/803, 825, 829, 831, 137/832, 833

[56] References Cited

U.S. PATENT DOCUMENTS

| | | | |
|---|---|---|---|
| 3,420,255 | 1/1969 | Wilkerson | 137/832 |
| 3,486,517 | 12/1969 | Gaura | 137/832 |
| 3,578,009 | 5/1971 | Spyropoulos | 137/832 |
| 3,877,486 | 4/1975 | Merrell et al. | 137/831 |

FOREIGN PATENT DOCUMENTS 54-30646  7/1979  Japan ................................... 137/832

*Primary Examiner*—A. Michael Chambers

[57] ABSTRACT

A fluid outlet structure includes cavities formed in both inner sidewalls of the outlet having control fluid passages from which control fluid is jetted toward a center of the outlet to deflect fluid flowing through the outlet. According to the invention, the fluid outlet structure comprises one or more supplementary fluid control members including supplementary cavities having respective supplementary control fluid passages, and communicating pipes for communicating the cavities in the sidewalls and supplementary cavities of the supplementary fluid control members having the fluid passages opening in the same directions, thereby obtaining deflected fluid flows with great deflecting angles.

3 Claims, 6 Drawing Figures

FLUID OUTLET STRUCTURE

BACKGROUND OF THE INVENTION

1. Field of the Invention:

The present invention relates to a fluid outlet structure using a fluid element, and more particularly to an air outlet structure arranged on a front surface of an instrument panel for an automobile.

2. Description of the Prior Art:

Air conditioning in a room of an automobile is generally effected by air jetted from various kinds of air outlets 10 arranged on a front surface of an instrument panel 9 as shown in FIG. 1.

In the prior art, in general, a main fluid passage of the outlet is provided on both sides with control fluid passages opening toward a center of the main fluid passage. These control fluid passages are selectively closed or opened by means of magnetic valves to flow control fluid toward the center of the main fluid passage, thereby obtaining deflected fluid flows.

With this arrangement, however, the control fluid does not provide adequate deflected angles and hence clearly deflected flows, particularly when a width of the main fluid passage is large. A wider fluid outlet may overcome this disadvantage to a certain extent. However, an instrument panel generally limits such an arrangement of the wider fluid outlet thereon.

SUMMARY OF THE INVENTION

It is a primary object of the invention to provide an improved fluid outlet structure which comprises one or more supplementary fluid control members having supplementary control fluid passages in a main fluid passage and communicating pipes communicating supplementary control fluid passages of the supplementary fluid control members with control fluid passages provided on both inner sides of the main fluid passage so as to flow the fluid simultaneously from these control fluid passages and supplementary control fluid passages, thereby making large the deflected angles of the flows through the outlet whereby the disadvantage of the invention is overcome.

The invention will be more fully understood by referring to the following detailed specification and claims taken in connection with the appended drawings.

DETAILED DESCRIPTION OF THE PREFERRED EMBODIMENT

Figure 1:
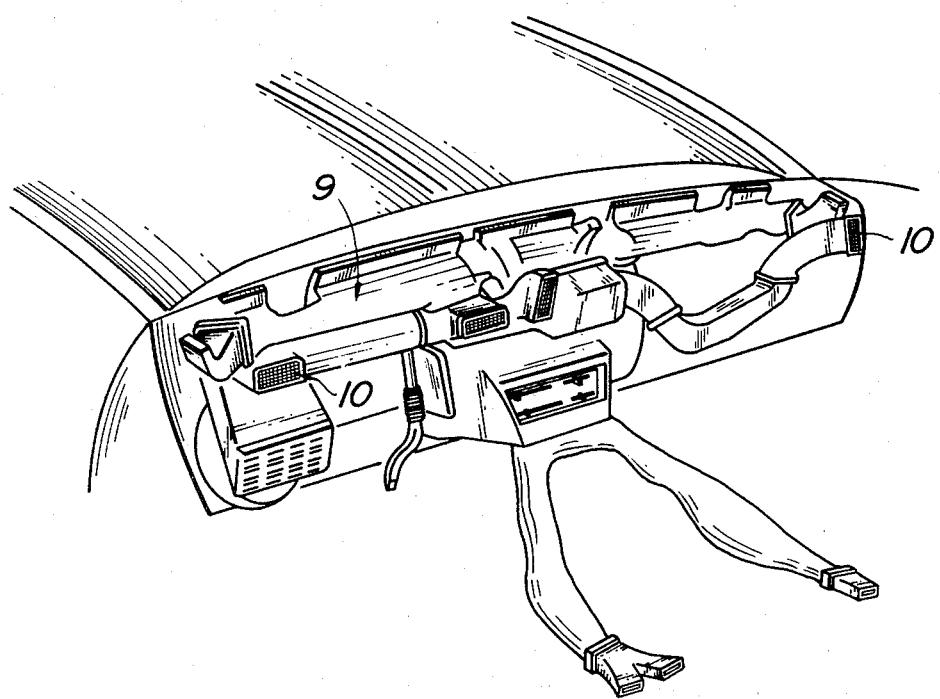
FIG. 1 is a perspective view of one example of arrangement of an air outlet provided on a front surface of an instrument panel as mentioned above.
Figure 2:
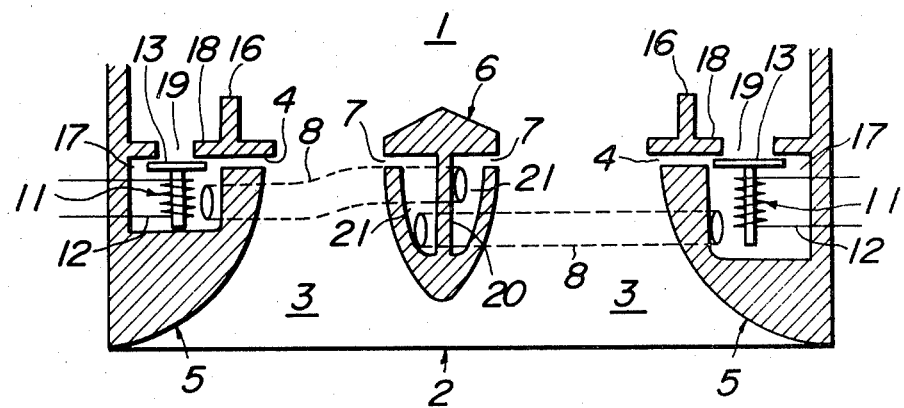
FIG. 2 is a diagrammatic sectional view of one embodiment of a fluid outlet according to the invention.

Referring to FIG. 2, a fluid element for use in the outlet structure according to the invention essentially comprises, as in the element of the prior art, a supply opening 1 for supplying compressed air, an outlet opening 2 corresponding to the supply opening 1 for jetting the air out of the element, a main fluid passage 3 formed between the supply opening 1 and outlet opening 2, and control fluid passages 4 arranged in opposite walls 5 of the main fluid passage 3. The term "fluid element" used herein means the above constructed by the above components. The fluid outlet structure according to the invention further comprises a supplementary fluid control member 6 having supplementary control fluid passages 7 at a center of the main fluid passage 3.

Figure 3:
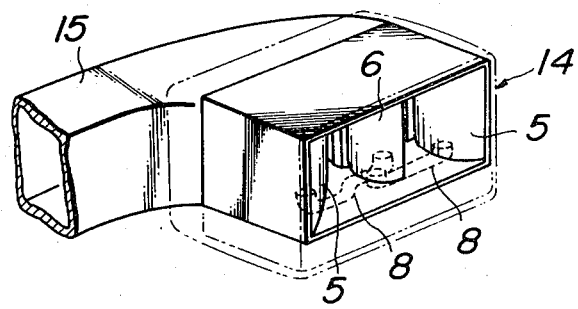
FIG. 3 is a perspective view illustrating a ventilation grille with the fluid outlet structure according to the invention.

As shown in FIG. 3, the main fluid passage 3 forms an air flow passage through which compressed air flows from a ventilation duct 15 connected to an upstream end of a rectangular ventilation grille 14 and out of the grille. Symmetrical sidewalls 5 forming both sidewalls of the main fluid passage 3 diverges toward the outlet opening 2. Each sidewall is formed on the side of the supply opening 1 with a ridge 16 for dividing the flowing air into two flows in the main fluid passage 3 and control fluid passages 4.

Each sidewall 5 is formed therein a cavity 17 having a partition 18 which defines the upstream end of the cavity 17 and is formed with an aperture 19. The sidewall 5 dividing the cavity 17 and main fluid passage 3 is formed at its upstream end with the control fluid passage 4 communicating the cavity 17 with the main fluid passage 3. In the cavity 17 is arranged a magnetic valve 11 comprising a magnetic coil 12 and a valve body 13 vertically movable by action of the magnetic coil 12. The valve body 13 closes and opens the aperture 19. When the aperture 19 is opened, the control fluid flows therethrough into the cavity 17 and through the control fluid passage 4 into the main fluid passage 3.

The supplementary fluid control member 6 provided at the substantially center of the main fluid passage 3 has a T-shaped cross-section to form two supplementary cavities 21 therein divided by a center wall 20. The supplementary cavities 21 communicate with the main fluid passage 3 through the supplementary control fluid passages 7 opening to the main fluid passage 3 correspondingly to the control fluid passages 4. The supplementary cavities 21 are communicated with the cavities 17 in the opposite sidewalls 5 through communication pipes 8 arranged on the bottom of the ventilation grille 14, respectively so that the control fluid which has flown into the cavities 17 in the sidewalls 5 flows partially through the communication pipes 8 into the supplementary cavities 21 and flows through the supplementary control fluid passages 7 toward the opposite sidewalls 5.

Figure 4:
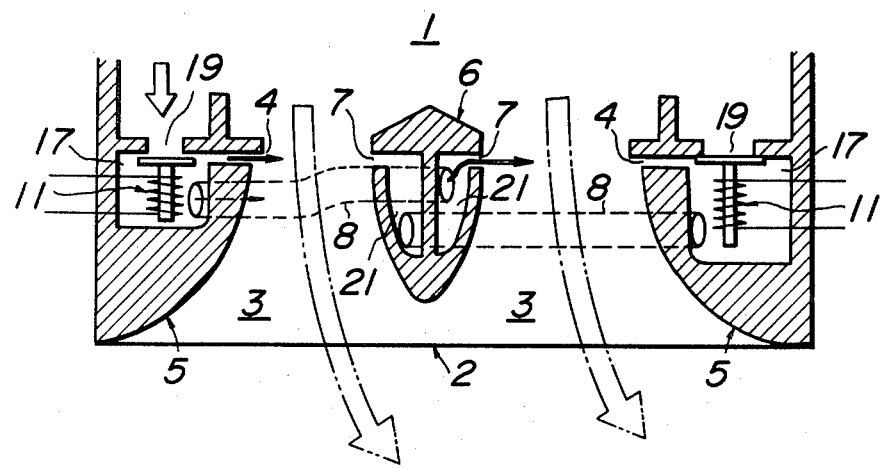
FIG. 4 is a view illustrating an operating condition for obtaining right deflected flow in the fluid outlet structure according to the invention.
Figure 5:
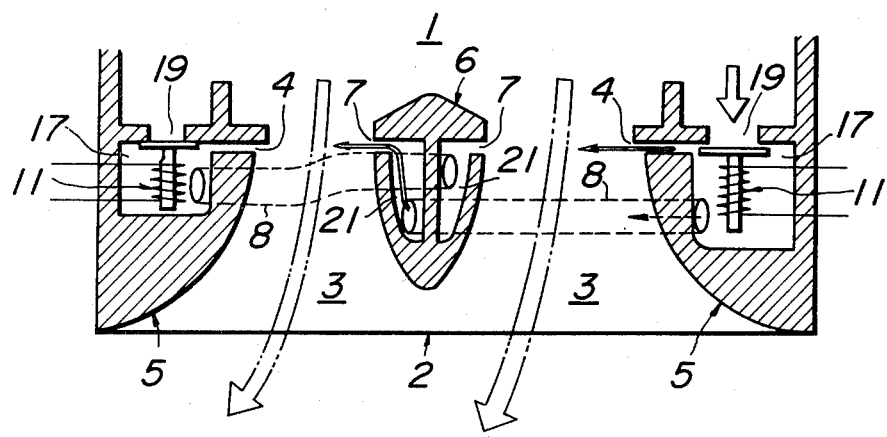
FIG. 5 is a view illustrating an operating condition for obtaining left deflected flow in the fluid outlet structure according to the invention.

FIGS. 4 and 5 illustrate operating status of the air outlet constructed as above described. In order to obtain deflection flow deflected to the right, as shown in FIG. 4 the magnetic valve 11 arranged in the sidewall 5 on the left side is actuated to open the aperture 19 and at the same time the magnetic valve 11 on the right side is closed, so that the control fluid in the cavity 17 on the left side is partially caused to flow through the control fluid passage 4 into the main fluid passage 3 and partially caused to flow through the communication pipe 8 into the supplementary cavity on the right side in the supplementary fluid control member 6 and through the supplementary control fluid passage 7 into the main fluid passage 3 in the same directions. The compressed air passing through the main fluid passage 3 is therefore, deflected to the right with the aid of the control fluid jetting out of the control fluid passage 4 and supplementary control fluid passage 7 and flows out of the outlet 2 along outer wall surfaces of the supplementary fluid control member 6 and sidewall 5. In this manner, the control fluids from the two fluid passages ensure the deflected flow with a great deflecting angle.

In order to deflect the flow to the left, as shown in FIG. 5 the magnetic valve 11 in the sidewall on the right side is actuated to open the right aperture 19 and the magnetic valve 11 in the left sidewall 5 is closed. In this manner, the control fluid is caused to flow through the control fluid passage 4 in the sidewall 5 and supplementary control fluid passage 7 on the side opposite to those in FIG. 4, so that the compressed air flowing through the main fluid passage 3 is subjected to air pressure from the right to be deflected to the left.

The open and close operations of the magnetic valves 11 in both the sidewalls 5 are repeated with a constant time interval to obtain alternate right and left deflected flows or swinging flows.

Moreover, both the magnetic valves 11 in the sidewalls 5 are closed to shut off the control fluid flows or opened to cancel the actions of the control fluid flows, thereby obtaining straight forwarding flows.

Figure 6:
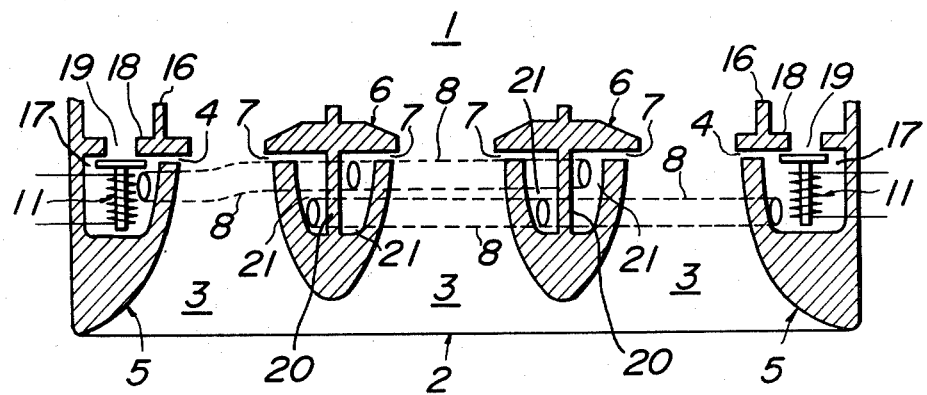
FIG. 6 is a diagrammatic sectional view of another embodiment of a fluid outlet according to the invention.

Referring to FIG. 6 illustrating a second embodiment of the invention, an outlet opening 2 of an air outlet is made wider than that of the first embodiment and two supplementary fluid control members 6 are provided in a main fluid passage. Each the supplementary fluid control member 6 includes two supplementary cavities 21 divided by a center wall 20 and supplementary control fluid passages 7 communicating the supplementary cavities 21 with the main fluid passage 3 as in the first embodiment. Each the supplementary fluid control member 6 includes a communication pipe 8 which communicates the supplementary cavities 21 of the relevant supplementary fluid control members 6 on the same sides and lead to the cavity 17 in the sidewall 5 having the control fluid passage 4 opening in the same direction as that of the supplementary control fluid passages of the supplementary cavities communicated by the relevant communicating pipe. In this manner, the two supplementary control members 6 are communicated with the cavities in the sidewalls 5.

With this arrangement of the air outlet for obtaining deflected flow, the compressed air passing through the three divided main fluid passages 3 is controlled by the control fluids from the control fluid passages 4 provided in the sidewalls 5 and supplementray control fluid passages 7 provided in the two supplementary fluid control members 6, so that large deflected angles and clearly deflected flows are obtained in spite of the wide outlet opening 2.

In addition, if the outlet opening is made much wider, supplementary fluid control members of a desired number suitable for the width of the opening may be provided.

As can be seen from the above description, the air outlet structure according to the invention comprises the supplementary fluid control member or members including the supplementary control fluid passages arranged in the main fluid passage of a fluid element. The supplementary control fluid passages are separately communicated with the control fluid passages in the respective sidewalls and adapted to cause the control fluid from the control fluid passage of one of the sidewalls to flow against the other sidewall, so that the compressed air passing through the main fluid passage is simultaneously subjected to actions of the control fluid from the sidewalls and supplementary fluid control members to make large the deflected flow angles caused thereby, with the result that the deflected flow can be jetted in a wide range.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A fluid outlet structure using a fluid element including a supply opening for supplying compressed fluid, an outlet opening corresponding to said supply opening for fluid exhaust, a main fluid passage formed between said openings and control fluid passages comprising cavities provided in sidewalls on inner opposite sides of said main fluid passage, two supplementary fluid control members, each having two supplementary cavities divided by a center wall forming a T-shaped body in each said supplementary fluid control member, each said supplementary cavity having a supplementary control fluid passage communicating with said main fluid passage, and two communicating pipes, each communicating with said cavity in one of said sidewalls and one of said supplementary cavities of said supplementary fluid control members remote from said sidewalls, so that each said supplementary control fluid passage causes control fluid from said control fluid passage of one of said sidewalls to flow against the other sidewall.

2. A fluid outlet structure as set forth in claim 1, wherein an upstream wall of said cavity in each said sidewall is formed with an aperture for receiving said compressed fluid as a control fluid into said cavity and a magnetic vlave is provided to close or open said aperture.

3. A fluid outlet structure using a fluid element including a supply opening for supplying compressed fluid, an outlet opening corresponding to said supply opening for fluid exhaust, a main fluid passage formed between said openings and control fluid passages of cavities provided in sidewalls on inner opposite sides of said main fluid passage, a supplementary fluid control member having supplementary cavities and supplementary control fluid passages in said main fluid passage, and communicating pipes for communicating said supplementary cavities with said cavities in said sidewalls, so that each said supplementary control fluid passage causes control fluid from said control fluid passage of one of said sidewalls to flow against the other sidewall, said supplementary fluid control member having a T-shaped cross-section and two said supplementary cavities therein divided by a center wall and each said communicating pipe communicating said cavity of one of said sidewalls with one of said supplementary cavities remote from said one of the sidewalls.

* * * * *